US009642311B2

(12) United States Patent
Posselius et al.

(10) Patent No.: US 9,642,311 B2
(45) Date of Patent: May 9, 2017

(54) ARRANGEMENT AND CONTROL OF PRECOMPRESSION ROLLS IN BALERS

(71) Applicant: CNH Industrial America LLC, New Holland, PA (US)

(72) Inventors: John Henry Posselius, Ephrata, PA (US); Christopher A. Foster, Mohnton, PA (US); Johan A. E. Vande Ryse, Bruges (BE); Didier O. M. Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/323,568

(22) Filed: Jul. 3, 2014

(65) Prior Publication Data

US 2014/0311365 A1    Oct. 23, 2014

Related U.S. Application Data

(62) Division of application No. 13/175,032, filed on Jul. 1, 2011, now Pat. No. 8,800,255.

(51) Int. Cl.
*A01D 39/00* (2006.01)
*A01D 43/02* (2006.01)
(Continued)

(52) U.S. Cl.
CPC .............. *A01F 15/10* (2013.01); *A01F 15/08* (2013.01); *A01F 15/0825* (2013.01)

(58) Field of Classification Search
CPC ... A01D 89/00; A01F 2015/102; A01F 15/10; A01F 15/141; A01F 15/00; A01F 15/106
(Continued)

(56) References Cited

U.S. PATENT DOCUMENTS 2,469,580 A    3/1944  Scranton
2,552,888 A *  5/1951  Druetta .................. A01F 15/04
                                              100/137
(Continued)

FOREIGN PATENT DOCUMENTS

DE    4102034 A1    7/1992
DE    4344585       6/1995
(Continued)

*Primary Examiner* — Árpád Fábián-Kovács
(74) *Attorney, Agent, or Firm* — Patrick M. Sheldrake

(57) ABSTRACT

A baler and a method of using the baler to produce high density bales based on arrangement and control of compression rollers. The baler comprises a pick-up assembly configured to pick-up crop material; a rotary feeder; a compression assembly comprising at least one compression roller configured to generate a pressure on the crop material as it passes between the compression roller and another compression component in the baler; and a bale chamber, wherein the pre-compressed crop forms a bale. The compression roller and compression component define an adjustable gap therebetween. The one or more compression rollers and/or baler compression components may be located in various locations in the baler. By adjusting the gap, pressure exerted on the crop material as it passes between the compression rollers and baler compression components may be controlled, resulting in bales of higher density.

12 Claims, 12 Drawing Sheets

(51) Int. Cl.
*A01D 75/00* (2006.01)
*A01F 15/10* (2006.01)
*A01F 15/08* (2006.01)

(58) Field of Classification Search
USPC ............ 56/341; 180/189, 139, 50, 142, 185
See application file for complete search history.

(56) References Cited

U.S. PATENT DOCUMENTS

| | | | |
|---|---|---|---|
| 2,644,283 A * | 7/1953 | Rogers et al. .................. | 56/341 |
| 3,914,926 A | 10/1975 | Braunberger et al. | |
| 4,009,559 A | 3/1977 | Mast | |
| 4,011,711 A * | 3/1977 | Mast ................................ | 56/341 |
| 4,034,543 A * | 7/1977 | Voth et al. ....................... | 56/341 |
| 4,062,172 A | 12/1977 | Rice et al. | |
| 4,262,478 A | 4/1981 | Pentith | |
| 4,446,678 A | 5/1984 | Smith | |
| 4,499,714 A | 2/1985 | Hollmann | |
| 4,510,741 A * | 4/1985 | Campbell ................ | A01F 15/07 100/88 |
| 4,510,861 A | 4/1985 | Campbell et al. | |
| 4,534,285 A | 8/1985 | Underhill | |
| 4,580,398 A | 4/1986 | Bruer et al. | |
| 4,597,249 A | 7/1986 | Bowden | |
| 4,604,855 A | 8/1986 | Krone et al. | |
| 4,619,106 A * | 10/1986 | van der Lely .......... | A01F 15/07 100/89 |
| 4,625,502 A | 12/1986 | Gerhardt et al. | |
| 4,656,812 A | 4/1987 | Busse et al. | |
| 4,686,812 A | 8/1987 | Bruer et al. | |
| 4,803,832 A * | 2/1989 | Crawford ......................... | 56/341 |
| 4,838,016 A | 6/1989 | Frogbrook et al. | |
| 4,912,914 A | 4/1990 | Wingard | |
| 5,052,170 A | 10/1991 | Trenkamp et al. | |
| 5,092,114 A * | 3/1992 | Eggenmueller .................. | 56/341 |
| 5,115,734 A | 5/1992 | Quartaert | |
| 5,224,328 A * | 7/1993 | Viaud .............................. | 56/341 |
| 5,255,501 A | 10/1993 | McWilliams | |
| 5,419,106 A | 5/1995 | Gemelli | |
| 5,630,313 A | 5/1997 | Von Allworden et al. | |
| 5,819,515 A | 10/1998 | Ratzlaff et al. | |
| 5,819,517 A * | 10/1998 | Amanatidis ............ | A01D 90/04 198/723 |
| 5,950,410 A * | 9/1999 | O'Brien et al. ................. | 56/341 |
| H001826 H * | 1/2000 | Anderson et al. ............... | 56/341 |
| 6,032,446 A | 3/2000 | Gola et al. | |
| 6,050,074 A * | 4/2000 | Clostermeyer ................. | 56/341 |
| 6,295,797 B1 | 10/2001 | Naaktgeboren et al. | |
| 6,421,990 B1 * | 7/2002 | Ohlemeyer et al. ....... | 56/10.2 R |
| 6,431,981 B1 * | 8/2002 | Shinners et al. ................... | 460/6 |
| 6,474,228 B1 * | 11/2002 | Leupe ..................... | A01F 15/04 100/100 |
| 6,546,705 B2 | 4/2003 | Scarlett et al. | |
| 6,601,375 B1 | 8/2003 | Grahl et al. | |
| 6,644,006 B1 | 11/2003 | Merritt et al. | |
| 6,655,121 B1 | 12/2003 | Viesselmann et al. | |
| 6,679,042 B1 * | 1/2004 | Schrag .................... | A01F 15/10 56/341 |
| 6,681,688 B1 * | 1/2004 | Smith ............................... | 100/5 |
| 6,688,092 B2 | 2/2004 | Anstey et al. | |
| 6,763,761 B1 * | 7/2004 | Smith ............................... | 100/5 |
| 6,874,311 B2 * | 4/2005 | Lucand et al. ................... | 56/341 |
| 6,877,304 B1 | 4/2005 | Smith et al. | |
| 7,337,603 B2 | 3/2008 | Johnson et al. | |
| 7,404,284 B2 * | 7/2008 | Viaud ..................... | A01F 17/00 100/6 |
| 7,437,866 B2 | 10/2008 | Smith et al. | |
| RE40,761 E | 6/2009 | Truitt | |
| 7,584,594 B2 * | 9/2009 | Viaud ................... | A01F 15/106 56/341 |
| 7,694,504 B1 * | 4/2010 | Viaud ................... | A01D 90/04 56/341 |
| 7,730,704 B2 * | 6/2010 | Viaud ................... | A01F 15/106 56/16.1 |
| 7,743,595 B2 | 6/2010 | Savoie et al. | |
| 7,861,506 B2 | 1/2011 | Humbert | |
| 8,056,314 B1 * | 11/2011 | Anstey ................. | A01F 15/106 56/364 |
| 8,113,110 B2 * | 2/2012 | Kraus ................... | A01F 15/101 100/180 |
| 8,291,687 B2 | 10/2012 | Herron et al. | |
| 8,627,766 B2 * | 1/2014 | Verhaeghe .......... | A01F 15/0825 100/189 |
| 8,910,460 B2 * | 12/2014 | Horstmann ......... | A01F 15/0705 100/88 |
| 2001/0042362 A1 * | 11/2001 | Scarlett .................. | A01F 15/08 56/10.2 G |
| 2002/0108508 A1 * | 8/2002 | Leupe ................. | A01F 15/0825 100/45 |
| 2004/0083704 A1 * | 5/2004 | Lucand et al. .................. | 56/341 |
| 2005/0252388 A1 * | 11/2005 | Krone ................. | A01F 15/0833 100/88 |
| 2005/0252389 A1 * | 11/2005 | Krone et al. .................... | 100/88 |
| 2006/0277888 A1 * | 12/2006 | Erdmann et al. ............... | 56/344 |
| 2007/0119140 A1 * | 5/2007 | Gette et al. ..................... | 56/364 |
| 2010/0115902 A1 * | 5/2010 | Schlesser et al. ......... | 56/10.2 R |
| 2010/0242747 A1 * | 9/2010 | Kraus ................... | A01F 15/101 100/35 |
| 2010/0242749 A1 * | 9/2010 | Demulder et al. ............. | 100/179 |
| 2012/0000377 A1 * | 1/2012 | Verhaeghe et al. ............. | 100/45 |
| 2013/0000496 A1 * | 1/2013 | Posselius ............. | A01F 15/0825 100/40 |
| 2013/0036921 A1 | 2/2013 | Horstmann | |
| 2013/0319263 A1 * | 12/2013 | Roberts et al. ................. | 100/43 |

FOREIGN PATENT DOCUMENTS

| | | | | |
|---|---|---|---|---|
| DE | 102005020777 A1 | 11/2006 | | |
| EP | 0467283 A2 | 7/1991 | | |
| EP | 0995352 A1 | 10/1999 | | |
| FR | 1239827 | 11/1959 | | |
| JP | H03117426 | 5/1991 | | |
| JP | 2003125643 A * | 5/2003 | ............ | A01F 15/10 |
| SU | 14104022 A1 * | 6/1988 | ............ | A01F 15/00 |
| WO | WO 2010106038 A1 * | 9/2010 | ........ | A01F 15/0825 |
| WO | WO 2014147179 A1 * | 9/2014 | .......... | A01D 89/006 |

* cited by examiner

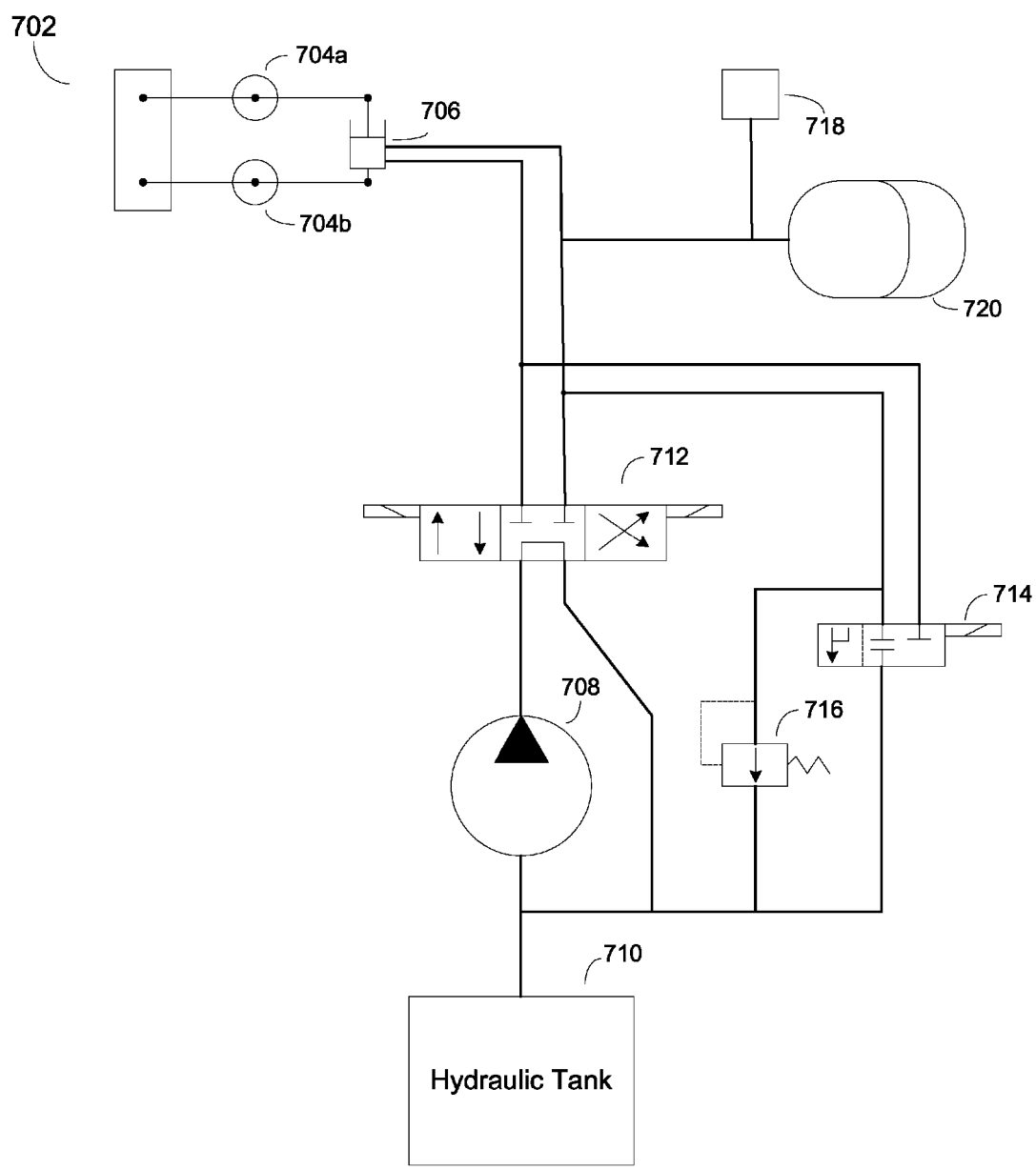

ARRANGEMENT AND CONTROL OF PRECOMPRESSION ROLLS IN BALERS

This divisional application claims priority under 35 U.S.C. §120 from co-pending U.S. patent application Ser. No. 13/175,032 filed on Jul. 1, 2011 by John H. Posselius, Christopher A. Foster, Johan A. Vande Ryse and Didier O. M. Verhaeghe with the same title, the full disclosure of which is hereby incorporated by reference.

TECHNOLOGY FIELD

The present disclosure relates generally to improved balers and methods for forming high density bales of crop materials.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, a pick-up assembly of the baler gathers the cut and windrowed crop material from the ground then conveys the cut crop material into a bale-forming chamber (or bale chamber) within the baler. A drive mechanism operates to activate the pick-up assembly, augers, and a rotor of the feed mechanism. A conventional bale chamber may include a pair of opposing sidewalls with a series of belts, chains, and/or rolls that rotate and compress the crop material into a cylindrical shaped bale. Square balers operate on similar principles but form "slices" which when stacked together form a rectangular or "square" bale.

Current round balers today rely on belt tension to regulate the bale density. However, as belt tension increases, the durability of the belt and rolls decreases. Thus, further increasing belt tension does not serve as a good option to increase bale density. Relatedly, it is also desirable to improve current square balers today to form high density bales.

High density bales are desirable because they would allow people to reduce the numbers of the bales to work with. The present invention is directed to these and other important ends.

SUMMARY

Embodiments of the present invention provides improved balers and methods for forming high density bales.

Embodiments of the present invention are directed to a baler comprising a pick-up assembly. The baler further includes a rotary feeder. The baler further includes a compression assembly. The compression assembly includes at least one compression roller configured to generate a pressure on crop material passed between the at least one compression roller and at least one baler compression component. The at least one compression roller and the at least one baler compression component define an adjustable gap therebetween. The compression assembly is configured to pre-compress the crop material passed therethrough. The baler further includes a bale chamber, wherein the pre-compressed crop forms a bale.

According to one embodiment of the invention, the at least one baler compression component is the rotary feeder. According to another aspect of one embodiment of the invention, the rotary feeder comprises one or more knives located on a periphery of the rotary feeder for cutting a crop material passing the rotary feeder to the bale chamber. According to another aspect of one embodiment of the invention, the compression assembly comprises dogs located on or about the compression assembly to sense at least one of: a crop material flow speed or an amount of crop material passing the compression assembly. According to another aspect of one embodiment of the invention, the rotary feeder and compression assembly are synchronized to efficiently generate pressure and cut the crop material passing between the rotary feeder and compression assembly.

According to one embodiment of the invention, the at least one baler compression component is one or more supplemental compression rollers. According to another embodiment of the invention, the baler further includes a pre-chamber, wherein the pre-chamber is located between the pick-up assembly and the bale chamber, and wherein the width of the pre-chamber differs from the width of the pick-up assembly. According to another aspect of one embodiment of the invention, the rotary feeder is located in the pre-chamber. According to another aspect of one embodiment of the invention, the at least one compression roller and the one or more supplemental compression rollers are located closer to the pick-up assembly than the rotary feeder is located to the pick-up assembly. According to another aspect of one embodiment of the invention, the at least one compression roller and the one or more supplemental compression rollers are located in or approximate to the pick-up assembly than the pre-chamber. According to another aspect of one embodiment of the invention, the lengths of the at least one compression roller and the one or more supplemental compression roller are approximate to the width of the pick-up assembly. According to another aspect of one embodiment of the invention, the at least one compression roller and the one or more supplemental compression rollers are located in or approximate to the pre-chamber than the pick-assembly. According to another aspect of one embodiment of the invention, the lengths of the at least one compression roller and the one or more supplemental compression roller are approximate to the width of the pre-chamber.

According to another embodiment of the invention, the baler further includes a pressure sensor. The pressure sensor detects the pressure generated by the at least one compression roller and the at least one baler compression component on the crop material passed therethrough. The gap between the at least one compression roller and the at least one baler compression component is adjustable to maintain the pressure generated by the at least one compression rollers and the at least one compression component on the crop material passed therethrough.

According to another embodiment of the invention, the at least one compression roller or at least one baler compression component are replaceable with another type of at least one compression roller or at least one baler compression component to take into account an optimal compression configuration for different harvesting conditions or crop materials.

According to another embodiment of the invention, the baler further includes a controller operably connected to the pick-up assembly, the rotary feeder, and the compression assembly to control the synchronization of the pick-up assembly, the rotary feeder, and the compression assembly.

According to another embodiment of the invention, the bale chamber is a square-bale chamber.

According to another embodiment of the invention, the baler further includes at least one starter roller and at least one floor roller to convey crop material into the bale chamber. The at least one starter roller or at least one floor roller incorporates the at least one compression roller and the bale chamber is a round-bale chamber.

Embodiments of the present invention are directed to a method for pre-compressing a crop material to form a high density bale including picking up crop material by a pick-up assembly. The method further includes conveying the crop material from the pick-up assembly to a bale chamber by a rotary feeder. The method further includes pre-compressing the crop material by a compression assembly. The compression assembly includes at least one compression roller configured to generate a pressure on crop material passed between the at least one compression roller and at least one baler compression component. The at least one compression roller defining an adjustable gap between the at least one compression roller and the at least one baler compression component. The compression assembly being configured to pre-compress the crop material passed between the at least one compression roller and the at least one baler compression component. The method further includes baling the pre-compressed material by a bale chamber to form a bale.

According to another embodiment of the invention, the method further includes cutting the crop material by one or more blades attached to the rotary feeder, wherein the at least one baler compression component is the rotary feeder. According to another aspect of one embodiment of the invention, the method further includes sensing at least one of a crop material flow speed or an amount of crop material between the rotary feeder and the compression assembly by one or more dogs located on or about the compression assembly. According to another aspect of one embodiment of the invention, the method further includes synchronizing the pick-up assembly, the rotary feeder, the compression assembly, and the bale chamber by a controller receiving sensed crop material flow speed or the amount of crop material from the one or more dogs.

According to another embodiment of the invention, replacing the one or more compression rollers with another type of compression roller to take into account an optimal compression configuration for different harvesting conditions or crop materials.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 7 illustrates an exemplary double acting hydraulic pressure control system according to an embodiment.

DETAILED DESCRIPTION

In some embodiments, the present invention provides an improved baler for forming high density bales of crop materials. The baler of the present invention can be either for square bales or round bales.

Figure 1:
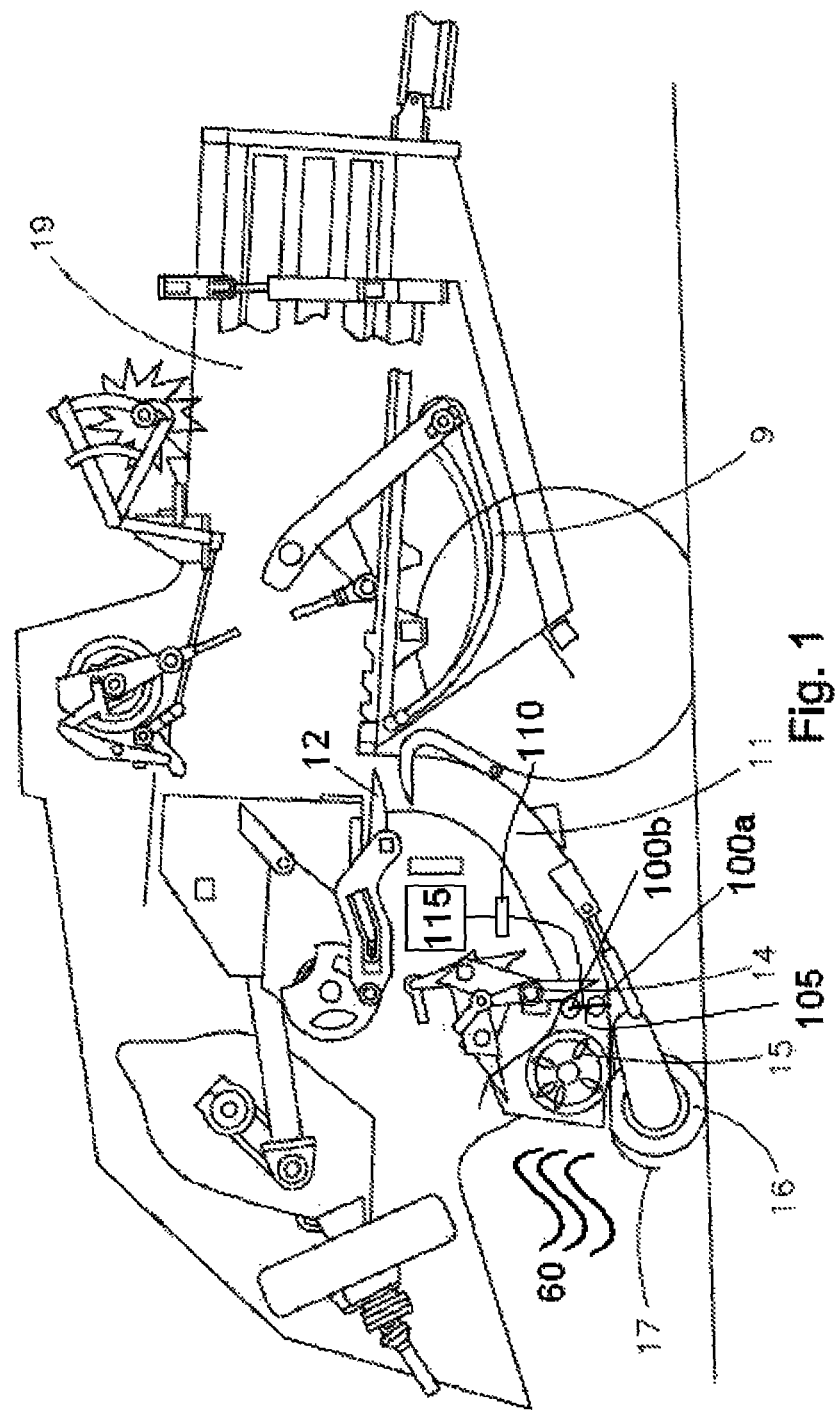
FIG. 1 illustrates a cutaway side elevational view of an exemplary square baler according to an embodiment.

FIG. 1 illustrates an exemplary square baler according to an embodiment of the present invention. When baling a crop material (such as hay) in a square bale, a baler (or baling apparatus) may be outfitted with a pre-chamber 11 that forms a slice of bale material. The pre-formed slice may be injected into the main bale chamber where a bale is formed.

As shown in FIG. 1, the pre-chamber 11 of the square baler may be positioned between a pick-up assembly and a bale chamber 19. The pick-up assembly may include pick-up tines 16, optional baffle plates 17, and one or more centering augers 15. The pick-up tines 16, baffle plates 17 and centering augers 15 may work in concert to pick up crop material 60 and align it for conveyance toward the pre-chamber 11. From the pick-up assembly, the crop material 60 may pass through a gap between one pair of opposing compression rollers, the pair including a lower roller 100a and an upper roller 100b. Depending on the mounting and arrangement of the lower roller 100a and the upper roller 100b, the gap between the two rollers may be adjustable. In some embodiments, one compression roller of the pair of opposing compression rollers (for example, the lower roller 100a) is fixed to a frame of the baler, and the other compression roller of the pair of opposing compression rollers (for example, the upper roller 100b) is floating (e.g., adjustably supported on the baler frame). In some embodiments, each of the compression rollers of the pair of opposing compression rollers is floating (adjustably supported on the baler frame).

The lower roller 100a and the upper roller 100b may be linked together, for example, by a hydraulic cylinder 105, a spring, or the like, to generate a pre-defined pressure on the crop material 60 passing therethrough. By applying the pressure to the crop material 60, the lower roller 100a and the upper roller 100b may act to pre-compress the crop material. In some embodiments of the invention, the lower roller 100a and the upper roller 100b can control the rate at which material is fed into the pre-chamber 11 and can optionally influence the distribution of the crop material in pre-chamber 11. In some embodiments, a hydraulic cylinder (such as the hydraulic cylinder 105 in FIG. 1) may be used to provide a reading of the pressure generated by the pair of opposing compression rollers on the crop material 60 passed therethrough. The lower roller 100a and the upper roller 100b may be driven by a motor to rotate towards one another so that the crop material 60 may be fed into the gap between the pair of rollers and may be pre-compressed by the pair of the roller as the rollers rotate.

As used herein, to pre-compress a crop material refers to decreasing/destroying the structural integrity of the each individual stem of the crop.

The pre-defined pressure generated by the pair of opposing compression rollers to pre-compress crop material passed therethrough depends on the nature of the crop material.

To maintain the pre-defined pressure generated by the lower roller 100a and the upper roller 100b on the crop material 60 passed therethrough, the gap between the lower roller and the upper roller may be adjusted, depending, for example, on the nature and thickness of the crop material that is to pass through the gap (e.g., the thickness of the crop matt). In some embodiments, the lower roller 100a and/or upper roller 100b may be driven by the crop flow. In some embodiments, there may be a pressure sensor 110 that detects the pressure generated by the pair of opposing compression rollers on the crop material passed therethrough; and the gap between the pair of opposing compression rollers of the compression assembly is adjustable/adjusted to maintain the pre-defined pressure generated by the pair of opposing compression rollers on the crop material passed therethrough. In some further embodiments, a controller 115 may be coupled to the pressure sensor 110, and adjustment of the gap between a pair of opposing compression rollers is automatically controlled by the controller. In other further embodiments, adjustment of the gap between the pair of opposing compression rollers is manually controlled by an operator of the baler.

Because of the pressure generated by the lower roller 100a and the upper roller 100b, it is preferable that the lower roller and the upper roller do not touch at any given time when in operation. For example, the gap between the lower roller 100a and the upper roller 100b may have a minimum value or threshold that is always maintained. For example, the minimum value or threshold may be less than or about 1.0 cm, about 1.2 cm, 1.3 cm, 1.4 cm, 1.5 cm, or about 2 cm.

It should be noted the gaps discussed above are shown by way of example only. The actual gap between the compression roller during operation may vary accordingly based upon a number of factors, including but not limited to, amount of crop being pre-compressed simultaneously, forward speed of the baler, type of crop being pre-compressed, and other similar factors.

It may be advantageous to localize reduction of structural integrity (pre-compressing) of crop materials at the gap between the lower roller 100a and the upper roller 100b. The localization of pre-compressing the crop material will reduce equipment requirements for other parts of the baler such as the bale chamber where bales are formed, for example, by a plunger. For example, by locally pre-compressing the crop material, a denser crop material is fed to the bale chamber. The size and associated pre-compressing/stacking force required for the baler forming device may be lowered as the crop material is already pre-compressed. This may also reduce any hydraulic requirements associated with the bale chamber as the force asserted on the crop material is reduced as a result of the crop material being pre-compressed locally at the compression rollers.

Those skilled in the art would be able to select suitable rollers for the compression rollers that pre-compress the crop materials (i.e., the lower roller 100a and the upper roller 100b). Based upon the application and intended use, the material and/or surface design of the rollers can be used as parameters for selection of rollers. For example, a metal roller (such as steel or stainless steel roller) is suitable to meet the pressure requirement needed to pre-compress of certain crop materials. For another example, a spiral roller or a high contact roller can be suitable because the small surface features of the spiral roller or the high contact roller can provide crop traction and the large flat surfaces can be suitable to compress the crop. The selection of suitable rollers also depends, in part, on the crop materials to be compressed. In some embodiments of the invention, the compression rollers may be removed and replaced by different types of compression rollers to take into account optimal configurations for different harvesting conditions or different crop materials.

The speed of the lower roller 100a and the upper roller 100b may be synchronized with the other parts of the baler. For example, the pick-up assembly and the bale chamber 19 may be synchronized with the lower roller 100a and the upper roller 100b. In this regard, the capacity of the lower roller 100a and the upper roller 100b matches the capacity of the pick-up assembly and the capacity of the bale chamber 19, and thus the entire baler operates efficiently with a minimized risk of overcollection/clogging. Speed of the lower roller 100a and the upper roller 100b may influence the transport of crop material and or its distribution through and out from the baler.

In some embodiments, the thickness of the crop material that is to pass through the lower roller 100a and the upper roller 100b may be determined by factors such as the speed of the pick-up assembly and the distance between the pick-up assembly and the pair of opposing compression rollers. In some embodiments, an optional series of packer forks; an optional rotary feeder mechanism; or a pair of rotary feeder and cutter can be employed, for example, to control the thickness of the crop material that is to pass through the pair of opposing compression rollers.

Figure 2:
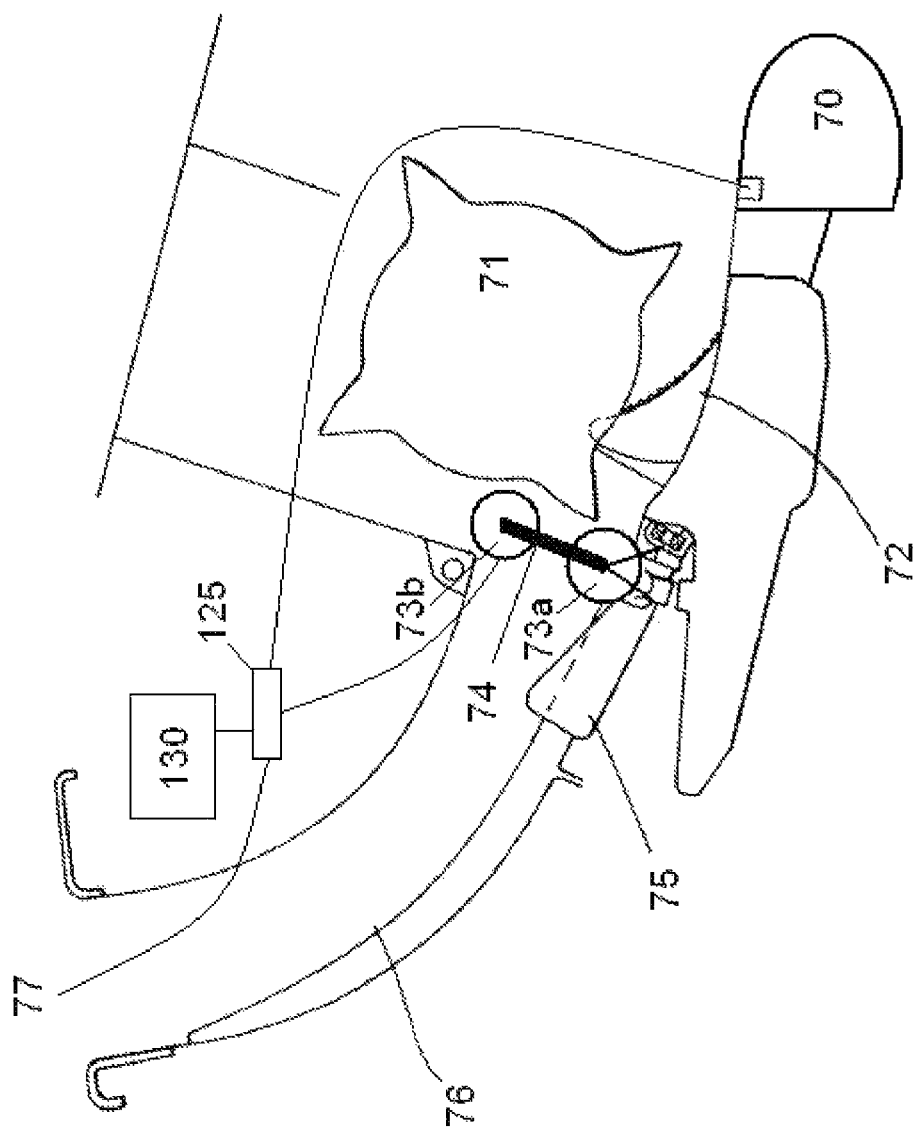
FIG. 2 illustrates a side view of a pick-up assembly, a pair of rotor and cutter, a pair of opposing compression roller, pre-chamber, a bale chamber of an exemplary square baler of the present invention.

Examples of packer forks and rotary feeder mechanism are described in U.S. Pat. No. 6,546,705, the disclosure of which is hereby incorporated by reference in its entirety. As shown in FIG. 2, a crop material (not shown) may be picked up via a pick-up assembly 70 and may pass a rotary feeder 71 and a cutter 72. From here, the crop material may pass through a gap between a lower fixed roller 73a and an upper floating roller 73b. As before, the lower fixed roller 73a and upper floating roller 73b may be configured and arranged such that they generate a pre-determined pressure to compress the crop materials passed therethrough. By utilizing a floating roller, that is freely movable or preloaded with a spring or by a hydraulic system, the configuration of the rollers allows for the processing of a variable rate of crop material in an adaptive manner. The pre-compressed material then passes a material sensor or "hay dog" 75 into the pre-chamber 76 and then to bale chamber 77 where bales are formed.

In some embodiments, the baler further comprises a speed sensor 125 or a group of speed sensors. The speed sensor(s) 125 may be configured to detect the speeds of the pick-up assembly, the pair of opposing compression rollers (e.g., lower roller 100a and upper roller 100b), and the bale chamber 77. In some further embodiments, the baler may comprise a controller 130 or a group of the controllers coupled to the speed sensor(s) 125, wherein the synchronization of the pick-up assembly 70, the pair of opposing compression rollers 73a and 73b, and the bale chamber 77 may be automatically controlled by the controller. In some embodiments, the synchronization of the pick-up assembly 70, the pair of opposing compression rollers 73a and 73b, and the bale chamber 77 may be manually controlled by an operator of the baler.

Referring again to FIG. 1, after the crop material 60 is pre-compressed by the lower roller 100a and the upper roller 100b, the crop material may pass an optional element 14, which may be forks or a rotor fork, configured and positioned to convey the pre-compressed crop material into the pre-chamber 11 where it is partially compressed. The pre-chamber 11 may be used to establish how much crop material 60 is in each slice. A baler operator may regulate the amount of material in one slice by varying parameters associated with the pre-chamber 11. Once that amount is reached, the material in the pre-chamber 11 may be injected into the bale chamber 19 by a crop holding finger, stuffer fork, and/or arm 12.

Once a slice is formed and ejected from the pre-chamber 11, a plunger, which may be continually driving like a piston in an engine, compresses the bale, forcing a slice, in FIG. 1 from left to right in the bale chamber 19. In this manner, slices are pushed to the right, as shown in FIG. 1, and compressed while forming the bale.

Square balers are well known in the agricultural industry, and the pick-assembly, pre-chamber, and bale chamber of any of such machines can be used in the square baler of the present invention. Examples of square balers can be found in U.S. application Ser. No. 12/871,439, filed Aug. 30, 2010 and entitled "Method of Tagging Square Bales," the content of which is hereby incorporated by reference in its entirety.

Figure 3:
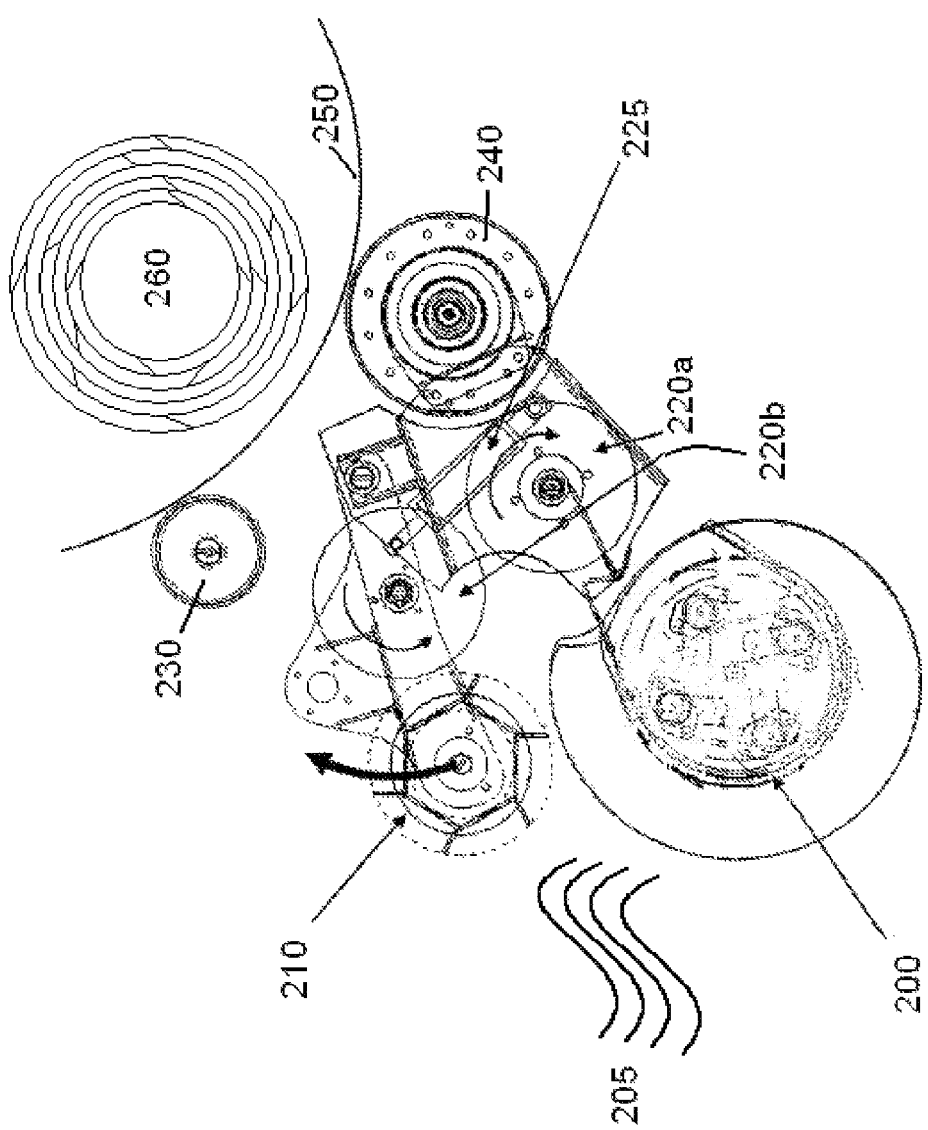
FIG. 3 shows a side view of an exemplary round baler of the present invention.

FIG. 3 shows an embodiment of the present invention including an exemplary round baler. As shown in FIG. 3, a pick-up assembly 200 may pick up crop material 205. From here, an optional feeder roller 210 may feed the crop material 205 through a gap between a pair of opposing compression rollers, specifically roller 220a and roller 220b, which are configured and positioned to generate a pre-defined pressure on the crop material passed therethrough to pre-compress the crop material. The roller 220a and the roller 220b may be similar in construction to the lower roller 100a and the upper roller 100b as shown in FIG. 1. The roller 220a and the roller 220b may be linked together, for example, by a hydraulic cylinder (such as hydraulic cylinder 225), a spring, or the like. The hydraulic cylinder 225 may be configured to generate a pre-defined pressure on the crop material 205 passed through the rollers 220a and 220b to pre-compress the crop material. The gap between the rollers 220a and 220b may be adjustable. In some embodiments, either roller 220a or roller 220b may be fixed to a frame of the baler while the other roller is floating (e.g., adjustably supported on the baler frame). In some embodiments, each of the rollers 220a and 220b may be floating (e.g., adjustably supported on the baler frame).

The pre-defined pressure generated by the rollers 220a and 220b to pre-compress the crop material 205 passed therethrough may depend on the nature of the crop material. A sensor and/or a controller (e.g., pressure sensor 110 and controller 115 as shown in FIG. 1) may be employed to sense and/or control the gap between roller 220a and roller 220b and/or the pressure generated by roller 220a and roller 220b on crop materials 205 passed therethrough.

The crop material 205 pre-compressed by roller 220a and roller 220b may then pass to starter roller 230 and floor roller 240 for further conveyance of crop material 205 into the bale chamber 250, and a bale chamber 250 where a round bale 260 is formed.

In some embodiments of the invention, the starter roller 230 and/or floor roller 240 may be reconfigured or modified so as to incorporate one or more compression rollers so as to generate a pressure on crop material 205. Compression, by a reconfigured or modified starter roller 230 and/or floor roller 240 with compression rollers, on crop material 205 may, for example, be generated for 50 pound/linear square inch as between them. In some embodiments, the starter roller 230 and floor roller 240 may be replaced with heavy duty crop processor style rollers for generating much higher pressures on crop material 205 entering the baler. The modified starter roller 230 and floor roller 240 may be positioned closer to one another so that a minimal gap between them may be consistently controlled. In other embodiments, a crop cutting rotor (not shown) in the round baler may also be reconfigured to generate compression on crop material 205 in the baler. Reconfiguration of starter rollers, floor rollers, and/or crop cutting rotors may also be applied to fixed chamber balers as well.

The speed of the pair of opposing rollers 220a and 220b may be synchronized with the other parts of the baler (e.g., the pick-up assembly and the bale chamber). In this regard, the capacity of the pair of opposing rollers 220a and 220b may match the capacity of the pick-up assembly 200 and the capacity of the bale chamber 250, and thus the entire baler operates without major congestion or clogging of crop material. One or more sensors and/or a controller (e.g., speed sensor 125 and controller 130 as shown in FIG. 2) may be employed to detect and control the speed of the pick-up assembly 200, the pair of opposing rollers 220a and 220b, and the bale chamber 250.

Round balers are well known in the agricultural industry, and the pick-assembly and bale chamber of any of such machines can be used in the round baler of the present invention. Examples of round balers can be found in U.S. Pat. Nos. 7,437,866, 6,877,304; 6,688,092; 6,644,006 and 6,295,797, the content of each of which is hereby incorporated by reference in its entirety.

The balers of the present invention may be configured to form high density bales. Comparing to a prior art baler (or a conventional baler), a baler of the present invention can improve the density of a baler by at least about 15%, 30%, 50%, 80%, 100%, 150%, or 200%.

Figure 4:
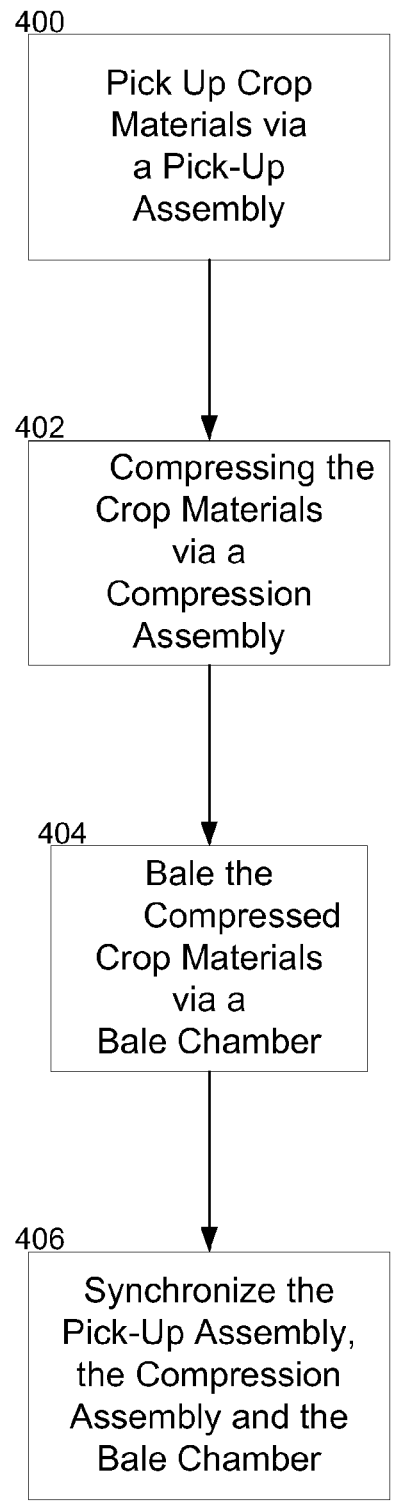
FIG. 4 illustrates an exemplary process for forming high-density bales according to an embodiment.

FIG. 4 illustrates an exemplary process for forming a high density bale according to an embodiment of the present invention. Initially, crop materials are picked up 400 by a pick-up assembly (e.g., pick-up assembly 200 as shown in FIG. 3). Once picked up 400, the crop materials may be pre-compressed 402 via a compression assembly. Exemplary compression assemblies are discussed above in regard to lower roller 100a and upper roller 100b, and rollers 220a and 220b. As discussed above, the compression assembly asserts a pre-compressing pressure to the crop materials, resulting in a pre-compressed crop material. Once the crop material is pre-compressed 402, the crop material is baled 404 via a bale chamber (e.g., bale chamber 19 as shown in FIG. 1 or bale chamber 250 as shown in FIG. 3).

Optionally, during the operation of the baling as shown in FIG. 4, two or more components of the baler may be synchronized 406. For example, the pick-up assembly, the compression assembly and the bale chamber may be synchronized 406 such that operation of the baler is performed smoothly without any clogging or congestion of crop material.

Figure 5:
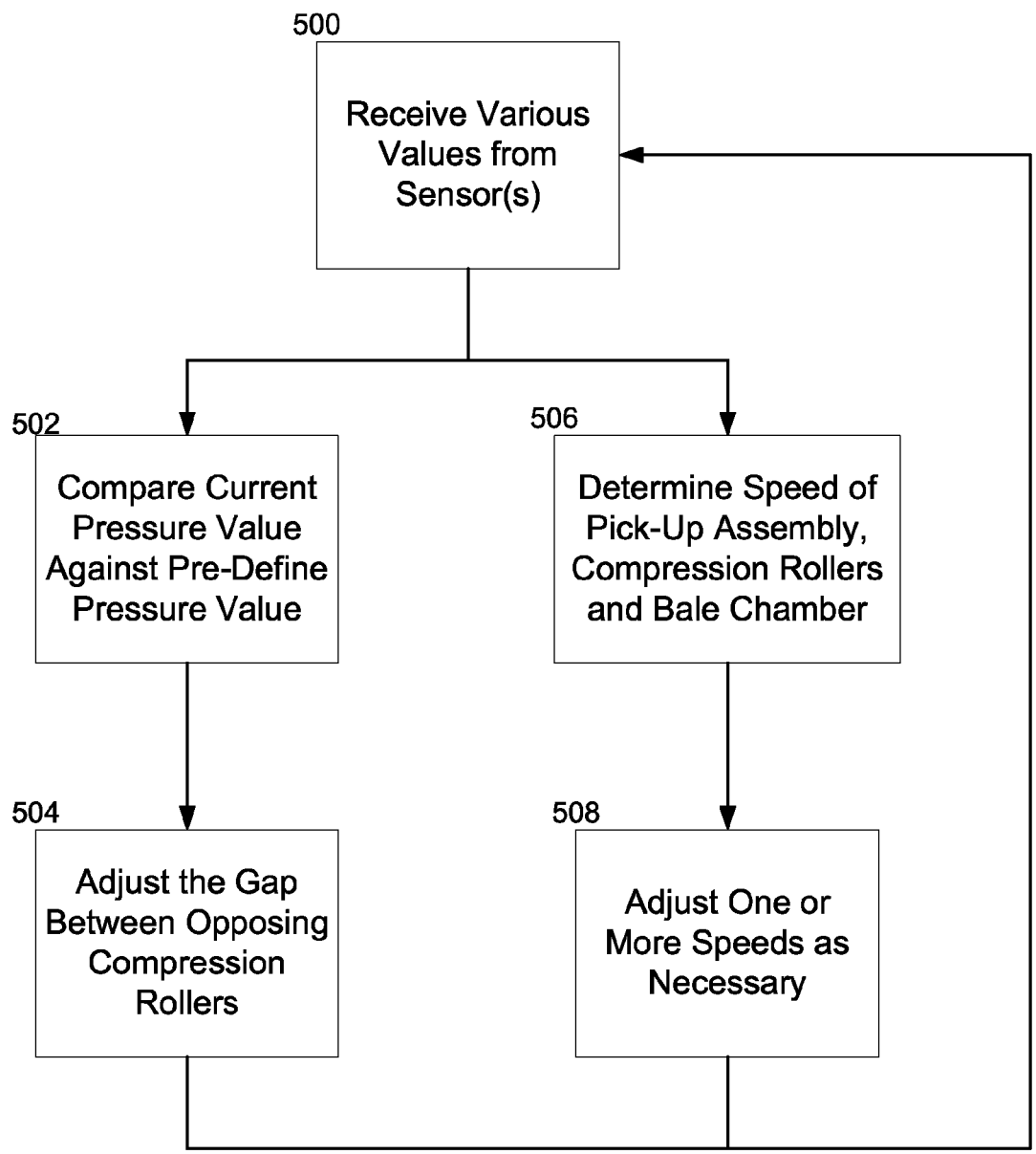
FIG. 5 illustrates an exemplary process for obtaining sensor readings and adjusting the performance of a baler according to an embodiment.

FIG. 5 illustrates an exemplary process for utilizing one or more sensors to optimize high density bale formation as well as the overall performance of a baler. In the example shown in FIG. 5, both a pressure sensor (e.g., pressure sensor 110 as shown in FIG. 1) and a speed sensor (e.g., speed sensor 125 as shown in FIG. 2) are used. However, it should be noted that this is shown for exemplary purposes only. Only one of the sensors may be used, or additional sensors may be added depending on the manufacture and intended use of the baler.

Initially, one or more controllers (e.g., controller 115 as shown in FIG. 1 and/or controller 130 as shown in FIG. 2) receives 500 various input values from the sensors. The controller may compare 502 the current pressure value received 500 from a pressure sensor against the pre-defined pressure value. As discussed above, the pre-defined pressure value may be based upon the type of crop material being baled as well as the desired density of the bales being formed. Based upon the comparison 502, the controller may adjust 504 the gap between the opposing compression rollers by sending a signal to a hydraulic cylinder linking the two rollers to either increase or decrease the gap. Alternatively, the gap may be manually adjusted by an operator of the baler to maintain the current pressure value as close to the pre-defined pressure value as possible.

Similarly, the controller (or a second controller) may determine 506 the speed of various components of the baler based upon the values received 500 from the sensors. For example, the controller may determine 506 the speed of the pick-up assembly, the compression rollers and the bale chamber. The controller may then adjust 508 the speed of one or more of the components in order to synchronize the components, thereby optimizing the throughput of the baler. Alternatively, the speed of the components may be manually adjusted by an operator of the baler.

After either adjustment 504, 508, the controller may receive 500 additional values from the sensor(s) and continue the process illustrated in FIG. 5 until operation of the baler is completed. It should be noted that the pressure and speed adjustment paths are shown in parallel for exemplary purposes only. The adjustments may occur simultaneously as shown in FIG. 5, sequentially one after the other, or according to a set pattern. For example, the pressure exerted by the compression rollers may be determined and adjusted once a minute while the speed of the individual components is monitored and adjusted every 15 seconds.

Figure 6:
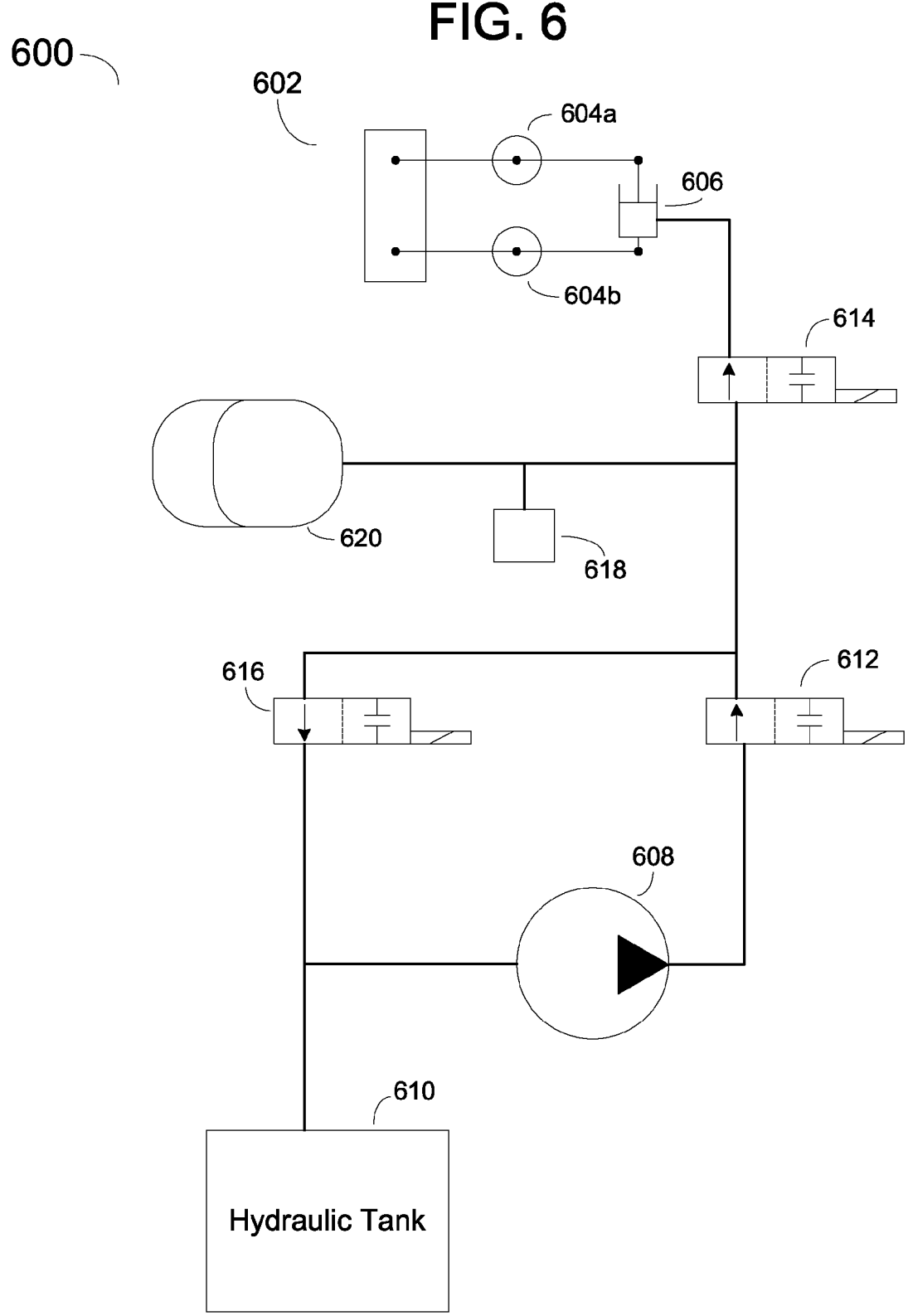
FIG. 6 illustrates an exemplary single acting hydraulic pressure control system according to an embodiment.

FIG. 6 illustrates an exemplary single action hydraulic pressure control system 600 for use with a set of compression rollers. The system 600 may include at least one compression roller assembly 602. The compression roller assembly may include a pair of compression rollers 604a and 604b as well as a hydraulic cylinder 606. A pump 608 may pump hydraulic fluid from a hydraulic tank 610 to the hydraulic cylinder 606 via one or more valves. For example, the pump 608 may pump hydraulic fluid through a pressure increase valve 612 and an isolation valve 614. The isolation valve 614 may be included to isolate the compression roller assembly 602 from any other components on the hydraulic system 600. The hydraulic system may also include a pressure release valve 616 for return of pressurized hydraulic fluid to the hydraulic tank 610.

Depending on the construction and manufacture of the baler, the hydraulic system may also include a pressure sensor 618 and a hydraulic accumulator 620. The hydraulic accumulator 620 may be positioned and configured to reduce pressure variation in hydraulic pressure in the hydraulic system 600 as the hydraulic cylinder 606 moves. Under demand, i.e., during operation of the baler, the hydraulic cylinder 606 may move as the crop mat thickness changes, thereby causing potential pressure variations in the hydraulic system 600. The Hydraulic accumulator 620 may act as a pressure reservoir to reduce these pressure variations. The pressure sensor 618 may be operably connected to a baler monitoring and/or control system for monitoring the pressure in the hydraulic system 600.

FIG. 7 illustrates an exemplary double action hydraulic pressure control system 700 for use with a set of compression rollers. The system 700 may include at least one compression roller assembly 702. The compression roller assembly may include a pair of compression rollers 704a and 704b as well as a hydraulic cylinder 706. A pump 708 may pump hydraulic fluid from a hydraulic tank 710 to the hydraulic cylinder 706 via one or more valves. For example, the pump 708 may pump hydraulic fluid through a double action pressure valve 712. The double action pressure valve 712 may be configured to operate as both a pressure increase valve and a pressure decrease valve. A two-port unloading valve 714 may be included to provide a manual means for removing any pressurized hydraulic fluid from the hydraulic system 700.

Hydraulic system 700 may further include a pressure relief valve 716. The pressure relief valve 716 may be configured to reduce the pressure exerted by the compression rollers 704a and 704b if a foreign object is fed into the baler with the crop material. For example, if a rock is fed into the baler and passed between the compression rollers 704a and 704b, the relief valve 716 may release the pressure on the compression rollers rather than damage the rollers trying to compress a rock.

Depending on the construction and manufacture of the baler, the hydraulic system may also include a pressure sensor 718 and a hydraulic accumulator 720. The hydraulic accumulator 720 may be positioned and configured to reduce pressure variation in hydraulic pressure in the hydraulic system 700 as the hydraulic cylinder 706 moves. Under demand, i.e., during operation of the baler, the hydraulic cylinder 706 may move as the crop mat thickness changes, thereby causing potential pressure variations in the hydraulic system 700. The Hydraulic accumulator 720 may act as a pressure reservoir to reduce these pressure variations. The pressure sensor 718 may be operably connected to a baler monitoring and/or control system for monitoring the pressure in the hydraulic system 700.

Figure 8A:
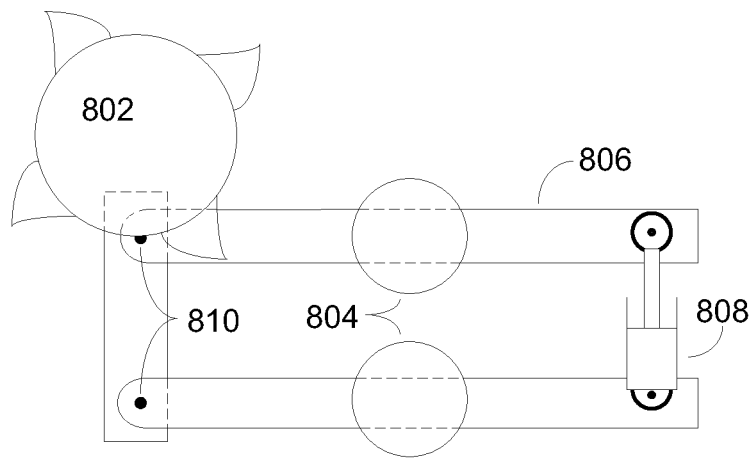
FIGS. 8a-c illustrate various mounting systems and arrangements for compression rollers according to an embodiment.
Figure 8B:
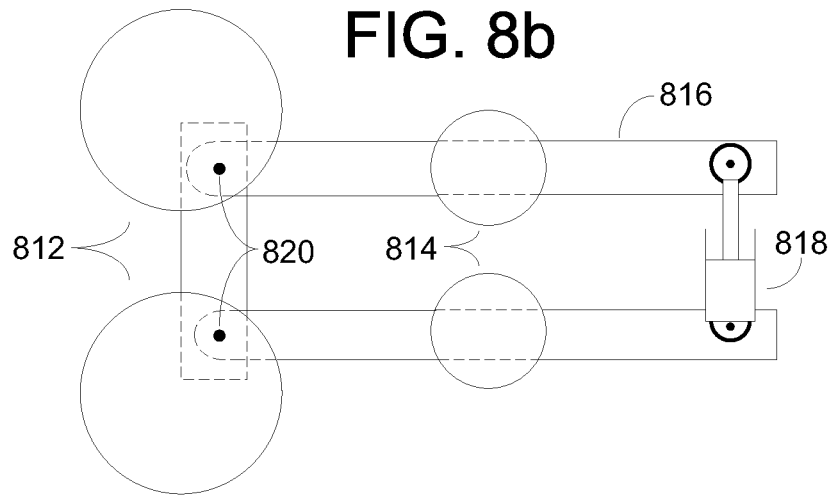
Figure 8C:
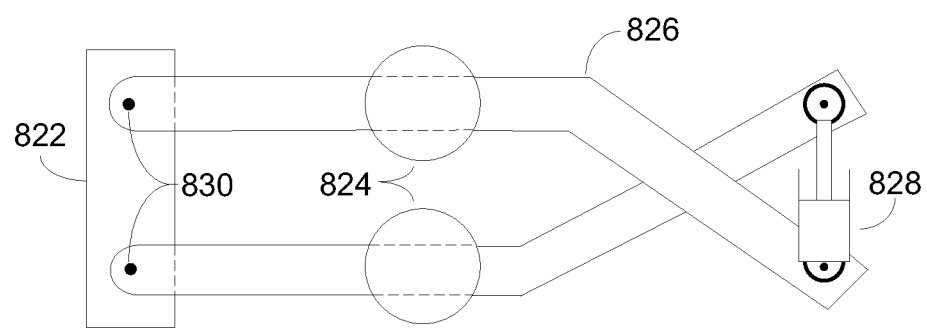

FIGS. 8a-c illustrates various mounting configurations for the compression rollers. FIG. 8a illustrates an exemplary mounting configuration for use with a rotary feeder 802. The pair of compression rollers 804 may be mounted on a steel frame 806. Two or more pivot points or pin joints 810 may be included to allow various components of the steel frame to pivot, thus allowing the compression rollers 804 to move forward or away from each other. The pressure exerted on crop material by the compression rollers 804 may be determined by a hydraulic pressure cylinder 808 in combination with the thickness of the crop material being compressed. The hydraulic cylinder 808 may extend and contract accordingly, depending upon the thickness and density of the crop material, to maintain a constant compression force. For example, if the thickness of the crop material increases, the hydraulic pressure at a rod end of the hydraulic cylinder 808 may also increase, thereby extending the hydraulic cylinder and moving the compression rollers further apart, thereby maintaining a constant compression force exerted on the crop material. Conversely, if the thickness of the crop material decreases, the hydraulic pressure at the rod end of the hydraulic cylinder 808 may also decrease, thereby contracting the hydraulic cylinder and moving the compression rollers 804 closer together.

FIG. 8b illustrates a similar configuration as FIG. 8a. A pair of converging rollers 812 may feed crop material to a pair of compression rollers 814. The pair of compression rollers 814 may be mounted on a steel frame 816. Two or more pivot points or pin joints 820 may be included to allow various components of the steel frame to pivot, thus allowing the compression rollers 814 to move forward or away from each other. Like in FIG. 8a, the pressure exerted on crop material by the compression rollers 814 may be determined by a hydraulic pressure cylinder 818 in combination with the thickness of the crop material being pre-compressed. The hydraulic cylinder 818 may extend and contract accordingly, depending upon the thickness and density of the crop material, to maintain a constant compression force. For example, if the thickness of the crop material increases, the hydraulic pressure at a rod end of the hydraulic cylinder 818 may also increase, thereby extending the hydraulic cylinder and moving the compression rollers further apart, thereby maintaining a constant compression force exerted on the crop material. Conversely, if the thickness of the crop material decreases, the hydraulic pressure at the rod end of the hydraulic cylinder 818 may also decrease, thereby contracting the hydraulic cylinder and moving the compression rollers 814 closer together.

FIG. 8c illustrates an alternative arrangement. The compression rollers 824 may be mounted on an X-shaped steel frame 826 having two crossing arms. Each arm may be pivotably attached to cross-member 822. Two or more pivot points or pin joints 830 may be included to allow various components of the steel frame to pivot, thus allowing the compression rollers 824 to move forward or away from each other. Like in FIGS. 8a and 8b, the pressure exerted on crop material by the compression rollers 824 may be determined by a hydraulic pressure cylinder 828 in combination with the thickness of the crop material being pre-compressed. The hydraulic cylinder 828 may extend and contract accordingly, depending upon the thickness and density of the crop material, to maintain a constant compression force. However, in FIG. 8c, the X-shape of the steel frame 826 results in inverted motion related to the extension and contraction of the hydraulic cylinder. For example, if the thickness of the crop material increases, the hydraulic pressure at a rod end of the hydraulic cylinder 828 may decrease, thereby contracting the hydraulic cylinder and moving the compression rollers further apart, thereby maintaining a constant compression force exerted on the crop material. Conversely, if the thickness of the crop material decreases, the hydraulic pressure at the rod end of the hydraulic cylinder 828 may increase, thereby extending the hydraulic cylinder and moving the compression rollers 824 closer together.

Figure 9:
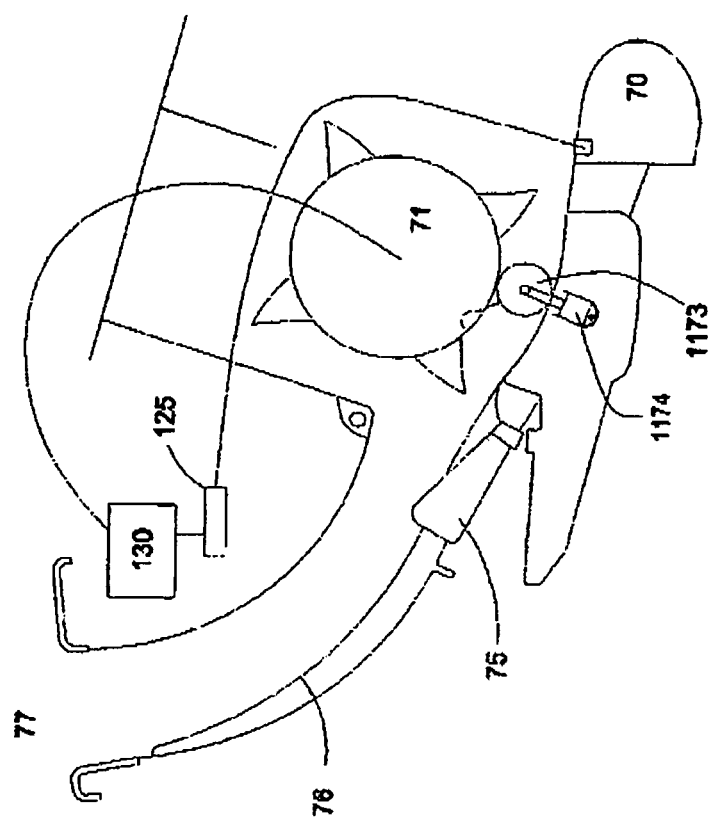
FIG. 9 illustrates a side view of a pick-up assembly, a rotor, a compression roller located beneath the rotor, a pre-chamber, and a bale chamber of an exemplary square baler of the present invention.

FIG. 9 illustrates a side view of a pick-up assembly, a rotor, a compression roller located beneath the rotor, a pre-chamber, and a bale chamber of an exemplary square baler of the present invention. As shown in FIG. 9, a crop material (not shown) may be picked up via a pick-up assembly 70 and may pass through a gap between a lower compression roller 1173 and the rotary feeder 71. The lower compression roller 1173 may be configured and arranged such that it generates a pre-determined pressure to pre-compress the crop materials passed between the lower compression roller 1173 and the rotary feeder 71. The lower compression roller 1173 may be fixed or floating. The lower compression roller 1173 may lower in a direction away from the rotary feeder 71 to allow more crop material to pass therethrough with less compression. The lower compression roller 1173 may also raise in a direction towards the rotary feeder 71 to compress the crop material against the rotary feeder 71. The rotary feeder 71 may contain knives, located on or about the perimeter of the rotary feeder 71 to cut crop material passing through the gap between the rotary feeder 71 and lower compression roller 1173. By utilizing a floating roller, that is freely movable or preloaded with a spring or by a hydraulic system 1174, the configuration of the roller allows for the processing of a variable rate of crop material in an adaptive manner. The pre-compressed material then may pass a material sensor or "hay dog" 75 into the pre-chamber 76 and then to bale chamber 77 where bales are formed. In some embodiments of the invention, the "hay dog" 75 prevents pre-compressed crop material, moving in the direction of the bale chamber 77 and away from the rotary feeder 71, from reversing direction back to the rotary feeder 71.

In some embodiments, the baler further comprises a speed sensor 125 or a group of speed sensors. The speed sensor(s) 125 may be configured to detect the speeds of the pick-up assembly, the lower compression roller 1173, and the bale chamber 19. In some further embodiments, the baler may comprise a controller 130 or a group of the controllers coupled to the speed sensor(s) 125, wherein the synchronization of the pick-up assembly 70, the lower compression roller 1173, and the bale chamber 19 may be automatically controlled by the controller. In some embodiments, the synchronization of the pick-up assembly 70, the lower compression roller 1173, and the bale chamber 19 may be manually controlled by an operator of the baler.

In some embodiments, the baler further comprises a speed sensor 125 or a group of speed sensors. The speed sensor(s) 125 may be configured to detect the speeds of the pick-up assembly, the lower compression roller 1173, and the bale chamber 77. In some further embodiments, the baler may comprise a controller 130 or a group of the controllers coupled to the speed sensor(s) 125, wherein the synchronization of the pick-up assembly 70, the lower compression roller 1173, and the bale chamber 77 may be automatically controlled by the controller. In some embodiments, the synchronization of the pick-up assembly 70, the lower compression roller 1173, and the bale chamber 77 may be manually controlled by an operator of the baler.

Figure 10:
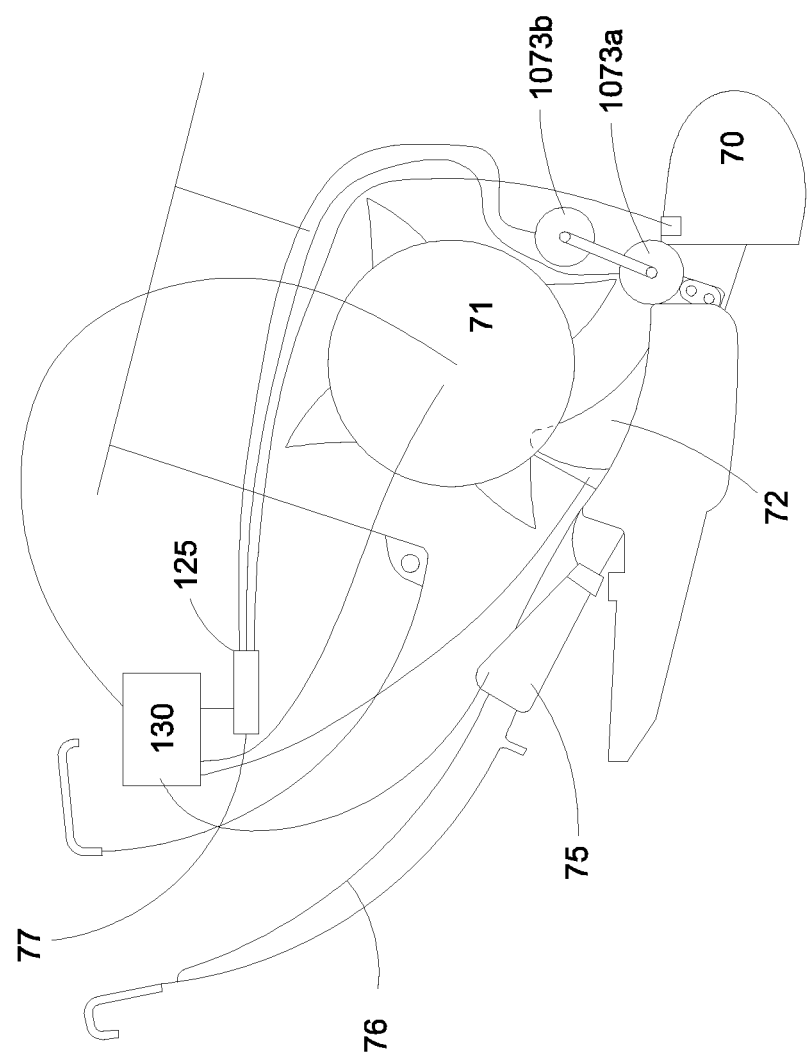
FIG. 10 illustrates a side view of a pick-up assembly, a pair of rotor and cutter, a pair of opposing compression rollers located between the pick-up assembly and pair of rotor and cutter, a pre-chamber, and a bale chamber of an exemplary square baler of the present invention.

FIG. 10 illustrates a side view of a pick-up assembly, a pair of rotor and cutter, a pair of opposing compression rollers located between the pick-up assembly and pair of rotor and cutter, a pre-chamber, and a bale chamber of an exemplary square baler of the present invention. As shown in FIG. 9, a crop material (not shown) may be picked up via a pick-up assembly 70 and may pass through a gap between a lower fixed compression roller 1073a and an upper floating compression roller 1073b before passing through the rotary feeder 71 and a cutter 72. The lower fixed compression roller 1073a and upper floating compression roller 1073b may be configured and arranged such that they generate a pre-determined pressure to pre-compress the crop materials passed therethrough. Either compression roller or both compression rollers may be fixed or floating. By utilizing a floating roller that is freely movable or preloaded with a spring or by a hydraulic system, the configuration of the rollers allows for the processing of a variable rate of crop material in an adaptive manner. The pre-compressed material then may pass a material sensor or "hay dog" 75 into the pre-chamber 76 and then to bale chamber 19 where bales are formed. In some embodiments of the invention, the "hay dog" 75 prevents pre-compressed crop material, moving in the direction of the bale chamber 19 and away from the rotary feeder 71 and cutter 72, from reversing direction back to the rotary feeder 19 and cutter 72.

In some embodiments, the baler further comprises a speed sensor 125 or a group of speed sensors. The speed sensor(s) 125 may be configured to detect the speeds of the pick-up assembly, the pair of opposing compression rollers (e.g., lower roller 1073a and upper roller 1073b), and the bale chamber 19. In some further embodiments, the baler may comprise a controller 130 or a group of the controllers coupled to the speed sensor(s) 125, wherein the synchronization of the pick-up assembly 70, the pair of opposing compression rollers 1073a and 1073b, and the bale chamber 19 may be automatically controlled by the controller. In some embodiments, the synchronization of the pick-up assembly 70, the pair of opposing compression rollers 1073a and 1073b, and the bale chamber 19 may be manually controlled by an operator of the baler.

In some embodiments of the invention, the pair of opposing compression rollers could contain material sensors, or "dogs", to measure, for example, the amount, speed, and/or direction of material passing between the lower fixed compression roller 1073a and upper floating compression roller 1073b. "Dogs" located on or about the pair of opposing compression rollers 1073a and/or 1073b, and the cutter 72 and/or knives located about the rotary feeder 71, may also be coupled to controller 130. The controller 130 may regulate cutter 72, and/or knives about the rotary feeder 71, and their position and/or speed by assessing the material flow sensed by the "dogs" located on or about the pair of opposing compression rollers 1073a and 1073b. The controller 130 may also adjust the distance between the pair of opposing compression rollers 1073a and 1073b by utilizing the sensed material flow information provided by the "dogs" located on or about the pair of opposing compression rollers 1073a and 1073b.

Figure 11:
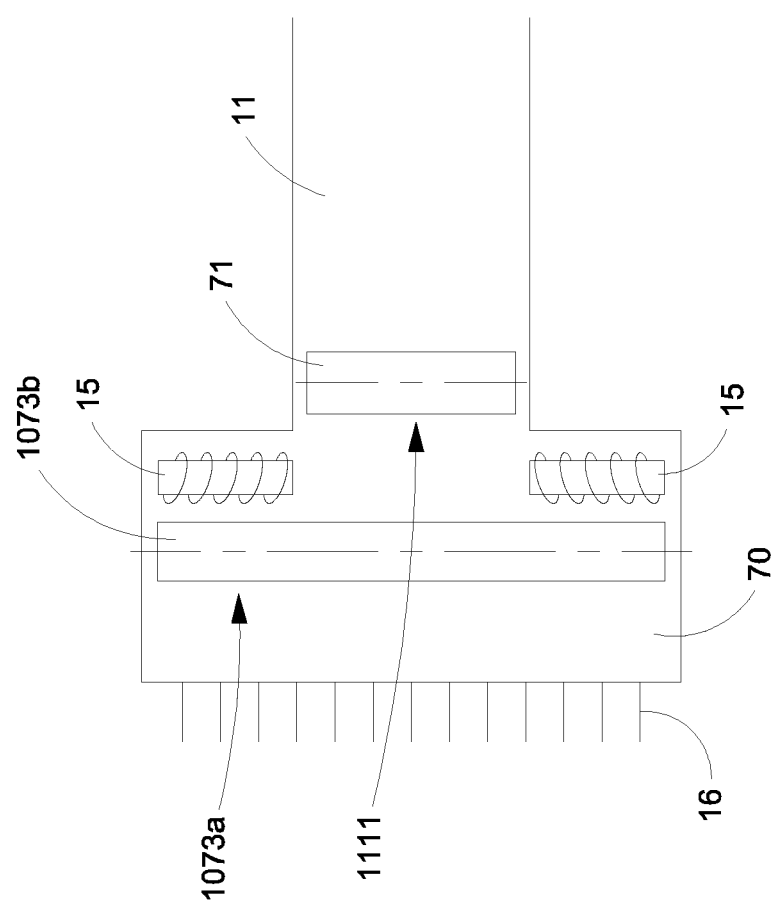
FIG. 11 shows a top-side perspective view of the pick-up assembly and pre-chamber from FIG. 10 in an exemplary square baler of the present invention.

FIG. 11 shows a top-side perspective view of the pick-up assembly and pre-chamber from FIG. 10, with the pair of opposing compression rollers located in proximity to the pick-up assembly, in an exemplary square baler of the present invention.

In some embodiments of the invention, the pair of opposing compression rollers 1073a and 1073b may be located about or in proximity to the pick-up assembly 70. As shown in FIG. 11, only upper floating compression roller 1073b is visible from this perspective because lower fixed compression roller 1073a is located beneath. At this location, crop material is compressed between the pair of opposing compression rollers 1073a and 1073b after entering the pick-up assembly 70 via the pick-up tines 16. In this embodiment, the lengths of the pair of opposing compression rollers 1073a and 1073b extend the width of the pick-up assembly 70.

Pre-compressed crop material exiting the pair of opposing compression rollers 1073a and 1073b is conveyed to in the direction of the pre-chamber throat 1111 with the aid of centering augers 15, or stub augers. The pre-compressed crop material is then further conveyed into the pre-chamber 11 by the rotary feeder 71.

Figure 12:
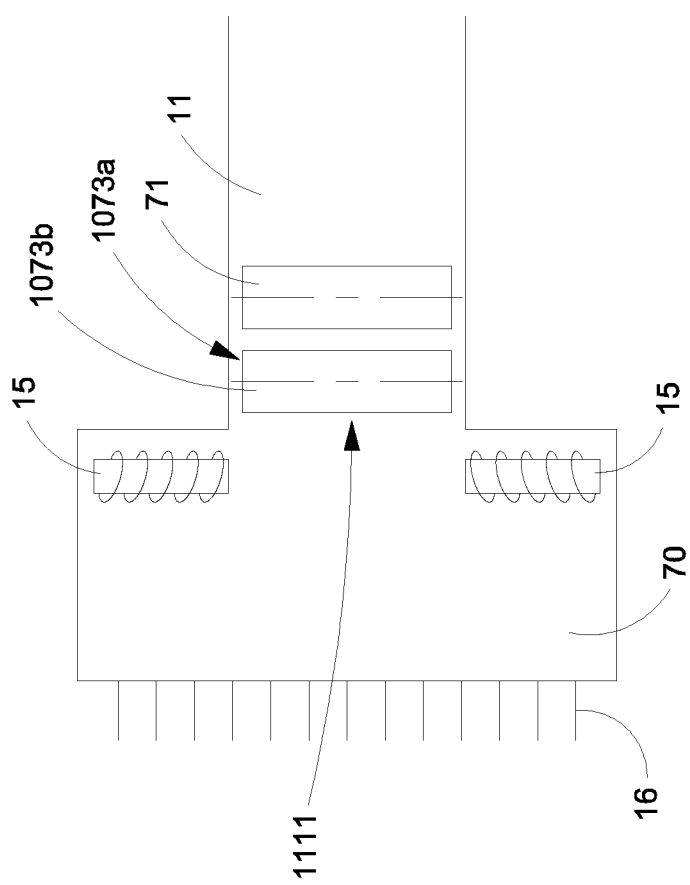
FIG. 12 shows a another top-side perspective view of the pick-up assembly and pre-chamber from FIG. 10 in an exemplary square baler of the present invention.

FIG. 12 shows a top-side perspective view of the pick-up assembly and pre-chamber from FIG. 10, with the pair of opposing compression rollers located in proximity to the pre-chamber, in an exemplary square baler of the present invention.

In other embodiments of the invention, the pair of opposing compression rollers 1073a and 1073b may be located about or in proximity to the pre-chamber 11. Again, as shown in FIG. 12, only the upper floating compression roller 1073b is visible from this perspective because lower fixed compression roller 1073a is located beneath. In this embodiment, crop material is aligned and conveyed by the pick-up tines 16 and centering augers 15 within the pick-up assembly 70 to enter the pre-chamber throat 1111. At the pre-chamber throat 1111, the width between the pick-up assembly 70 and pre-chamber 11 is reduced. As the crop material enters the pre-chamber throat 1111, it is compressed between the pair of opposing compression rollers 1073a and 1073b located about and/or in proximity to the pre-chamber 11. In this embodiment, the lengths of the pair of opposing compression rollers 1073a and 1073b extend the width of the pre-chamber 11.

Pre-compressed crop material exiting the pair of opposing compression rollers 1073a and 1073b is further conveyed to the rotary feeder 71 and then into the pre-chamber 11 by the rotary feeder 71.

Formation of higher density bales is advantageous in the handling of bales.

Although the invention has been described with reference to exemplary embodiments, it is not limited thereto. For example, two pairs of opposing compression rollers can be employed to ensure pre-compress crop materials. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A baler comprising:
   a pick-up assembly;
   a rotary feeder having a plurality of knives located downstream of the pickup assembly;
   a compression assembly comprising at least one compression roller configured to generate a pressure on crop material passed between the at least one compression roller and the rotary feeder, the at least one compression roller having axis of rotation on opposing side of an adjustable gap from the rotary feeder, wherein the compression roller is connected to a hydraulic system configured to floatingly adjust the position of the compression roller to remain in the crop flow path in compressing contact with crop material in the crop flow path, wherein the gap is controlled by a control system for monitoring a pressure in the hydraulic system, the control system configured for adjusting the position of the compression roller with the hydraulic system in response to the monitored pressure to apply a predetermined compression force on crop material within the gap; and
   a bale chamber, positioned downstream of the compression assembly and configured to receive pre-compressed crop.

2. The baler of claim 1, wherein the plurality of knives are located on a periphery of the rotary feeder for cutting a crop material passing the rotary feeder to the bale chamber.

3. The baler of claim 2, wherein the compression assembly comprises dogs located on or about the compression assembly to sense at least one of: a crop material flow speed or an amount of crop material passing the compression assembly.

4. The baler of claim 3, wherein the rotary feeder and the compression roller is synchronized to generate pressure and cut the crop material passing between the rotary feeder and compression roller.

5. The baler of claim 1, wherein the control system for monitoring pressure in the hydraulic system comprises a controller and a pressure sensor connected to the hydraulic system, wherein the pressure sensor detects the pressure generated by the compression assembly on the crop material passed therethrough; and wherein the controller is connected to the hydraulic system and configured to adjust the gap between the compression roller and the rotary feeder to maintain the pressure generated by the compression assembly on the crop material passed therethrough.

6. The baler of claim 1, wherein the baler is a square baler and a pre-chamber is positioned between the pick-up assembly and the bale chamber.

7. The baler of claim 1, wherein a material sensor or hay dog is located within the crow flow path between the compression assembly and the pre-chamber, the pre-chamber located prior to the bale chamber.

8. A method for pre-compressing a crop material to form a high density bale comprising:
picking up crop material by a pick-up assembly;
conveying the crop material along a crop flow path from the pick-up assembly to a bale chamber by a rotary feeder having a plurality of knives;
pre-compressing the crop material by a compression assembly, wherein the compression assembly comprises the rotary feeder and at least one compression roller configured to generate a pressure on crop material passed therebetween, the at least one compression roller and the rotary feeder defining an adjustable gap, the compression assembly configured such that the position of the compression roller is floatingly adjusted by a hydraulic system connected to a control system for monitoring a pressure in the hydraulic system the control system configured to apply a predetermined compression force with the hydraulic system to pre-compress crop material in the gap between the at least one compression roller and the rotary feeder in response to the monitored pressure; and
baling the pre-compressed material by a bale chamber to form a bale.

9. The method of claim 8 further comprising cutting the crop material by the plurality of knives attached to the rotary feeder.

10. The method of claim 9 further comprising sensing at least one of a crop material flow speed or an amount of crop material between the rotary feeder and the compression assembly by one or more dogs located on or about the compression assembly.

11. The method of claim 10 further comprising synchronizing the pick-up assembly, the rotary feeder, the compression assembly, and the bale chamber by a controller of the control system receiving sensed crop material flow speed or the amount of crop material from the one or more dogs.

12. The method of claim 8, wherein the control system comprises a pressure sensor connected to a controller, wherein the pressure sensor detects the pressure generated by the compression assembly on the crop material passed therethrough; and wherein the controller is connected to the hydraulic system configured to adjust the gap between the compression roller and the rotary feeder to maintain the pressure generated by the compression roller and the rotary feeder on the crop material passed therethrough.

* * * * *